Jan. 27, 1959  G. R. SMITH  2,870,686
AUTOMATIC EXPANDING MANDREL
Filed April 28, 1954  5 Sheets-Sheet 1

INVENTOR.
GORDON RAYMOND SMITH
BY
Barnes, Kisselle, Laughlin & Raisch
ATTORNEYS

INVENTOR.
GORDON RAYMOND SMITH
BY
ATTORNEYS.

Jan. 27, 1959 G. R. SMITH 2,870,686
AUTOMATIC EXPANDING MANDREL
Filed April 28, 1954 5 Sheets-Sheet 5

INVENTOR.
GORDON RAYMOND SMITH
BY
Barnes, Kisselle, Laughlin & Raisch
ATTORNEYS.

United States Patent Office 2,870,686
Patented Jan. 27, 1959

2,870,686

AUTOMATIC EXPANDING MANDREL

Gordon Raymond Smith, Detroit, Mich., assignor of one-half to Earl R. Lowe, East Detroit, Mich.

Application April 28, 1954, Serial No. 426,064

13 Claims. (Cl. 90—11.58)

This invention relates to an automatic expanding mandrel for facilitating the machining of hollow workpieces.

An exemplary application of the invention lies in using the mandrel to support a portion of a pipe which is being threaded on a planetary milling machine. In such an operation the pipe is clamped in a chuck and a rotating thread cutting tool is revolved around the axis of the pipe to cut the threads, either on the exterior or the interior of the pipe.

It is an object of this invention to provide a device for supporting the portion of the pipe or workpiece being cut against the force of the cutting tool and to provide means for disengaging the device and the workpiece. The invention is carried out generally by means of a floating expanding mandrel which engages the workpiece during the machining and automatic means for releasing the mandrel and supporting it independently of the workpiece to permit removal of the workpiece after the machining has been completed. One form of the invention is shown in the accompanying drawings which may be briefly described as follows:

Figure 1:
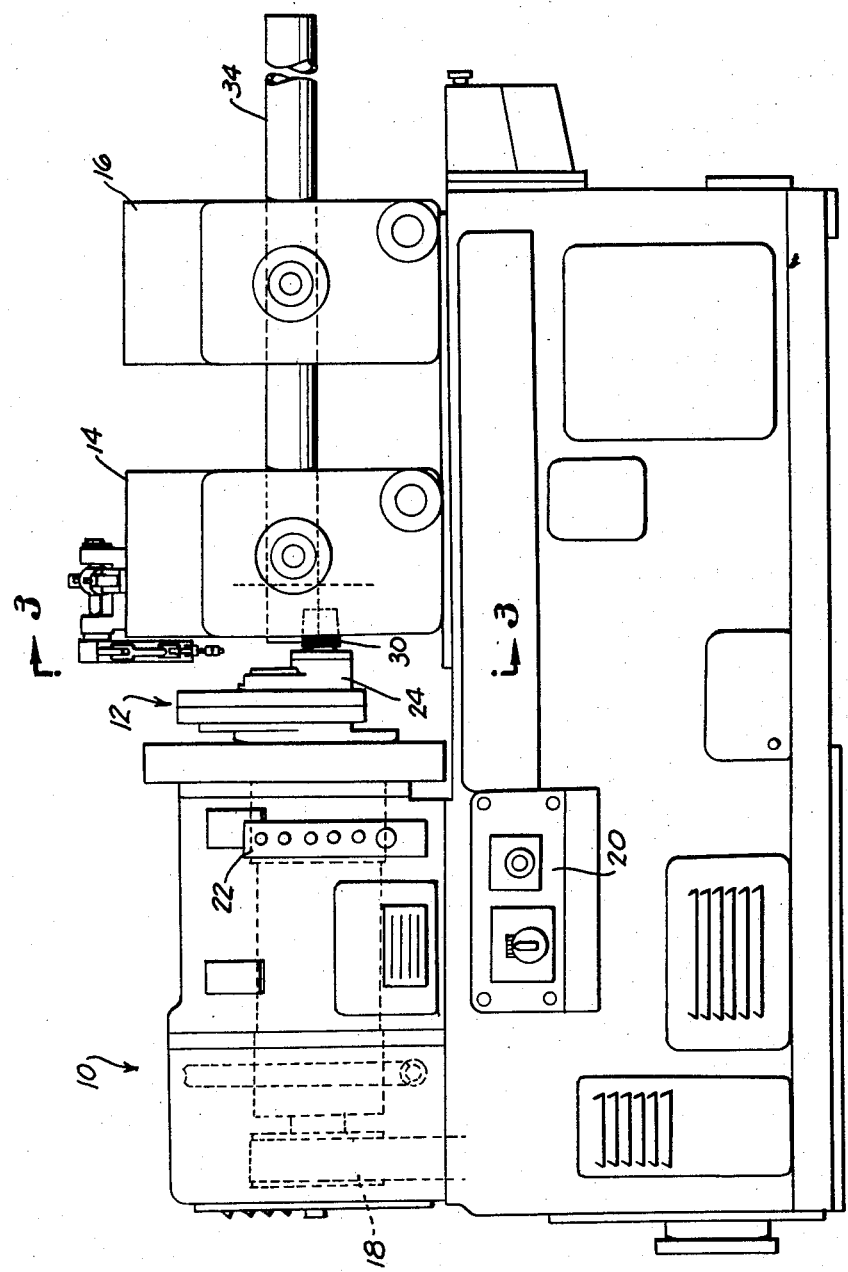
Fig. 1 is a partly diagrammatic elevation of a planetary milling machine utilizing the device of this invention in threading a length of pipe.

Fig. 1 shows a planetary milling machine 10 generally of the type disclosed in Norberg 2,312,354, March 2, 1954, and Norberg 2,553,669, May 22, 1951. This machine has a planetary head 12 and work holders 14 and 16. Spindle drive means are generally indicated in dotted lines 18 and control panels for the machine are shown at 20 and 22.

Figure 2:
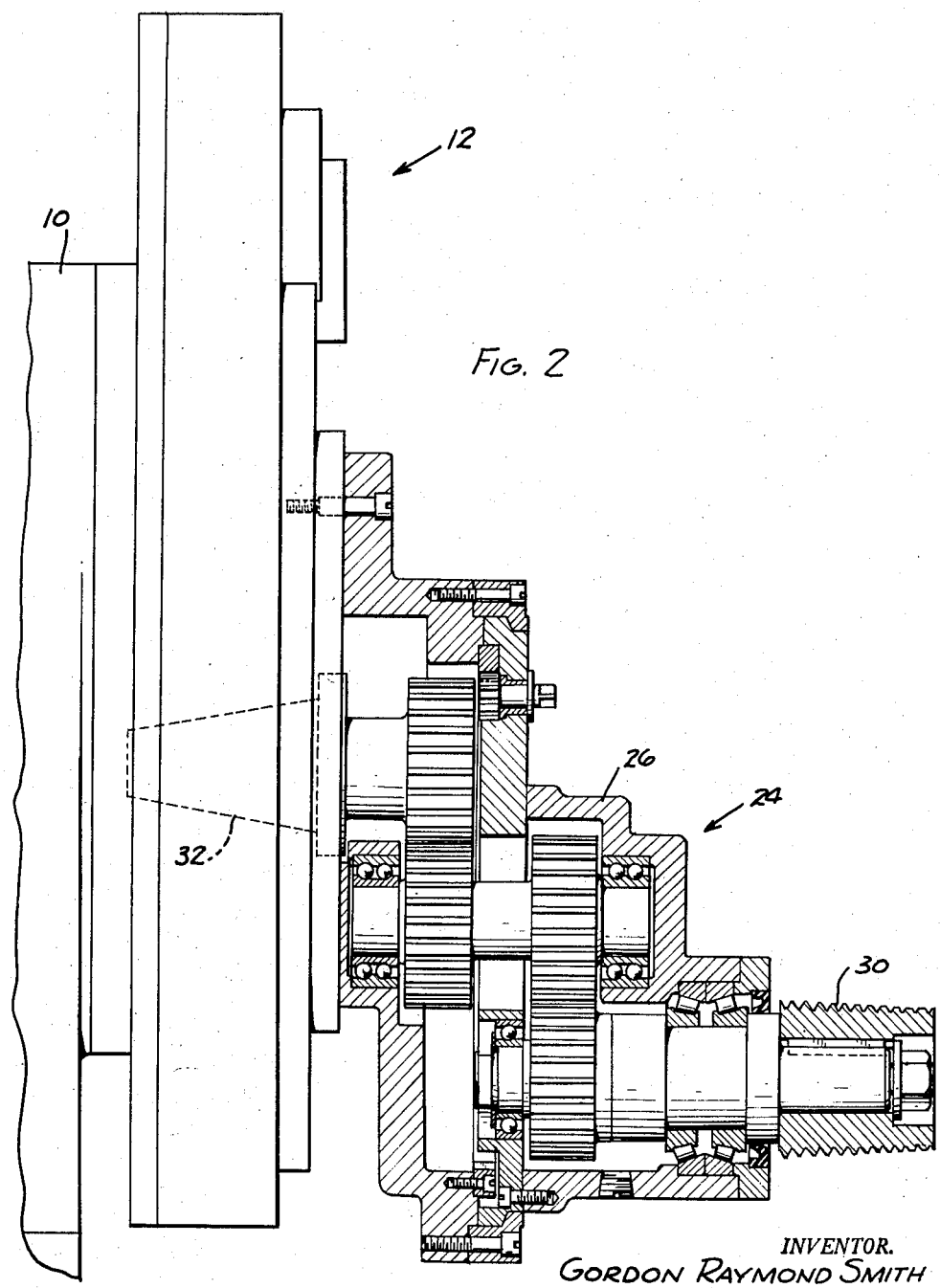
Fig. 2 is a sectional view showing an extension attachment on the planetary head with some parts shown in elevation.

The planetary head 12 is shown as including an extension attachment 24 which may be of the type disclosed in Norberg 2,312,354 for cutting straight threads on a workpiece or of the type disclosed in Norberg 2,553,669 for cutting taper threads on a workpiece. The extension 24 is of the latter type and as shown in Fig. 2 includes a housing 26 carrying a gear train through which a taper cutting tool 30 is driven by the main spindle 32 of the milling machine. The housing and the cutting tool thereon are revolved about a workpiece or tube 34 while the tool is being rotated and means contained in the milling head simultaneously advance the cutting tool and move it radially to cut the taper thread in the workpiece.

Figure 3:
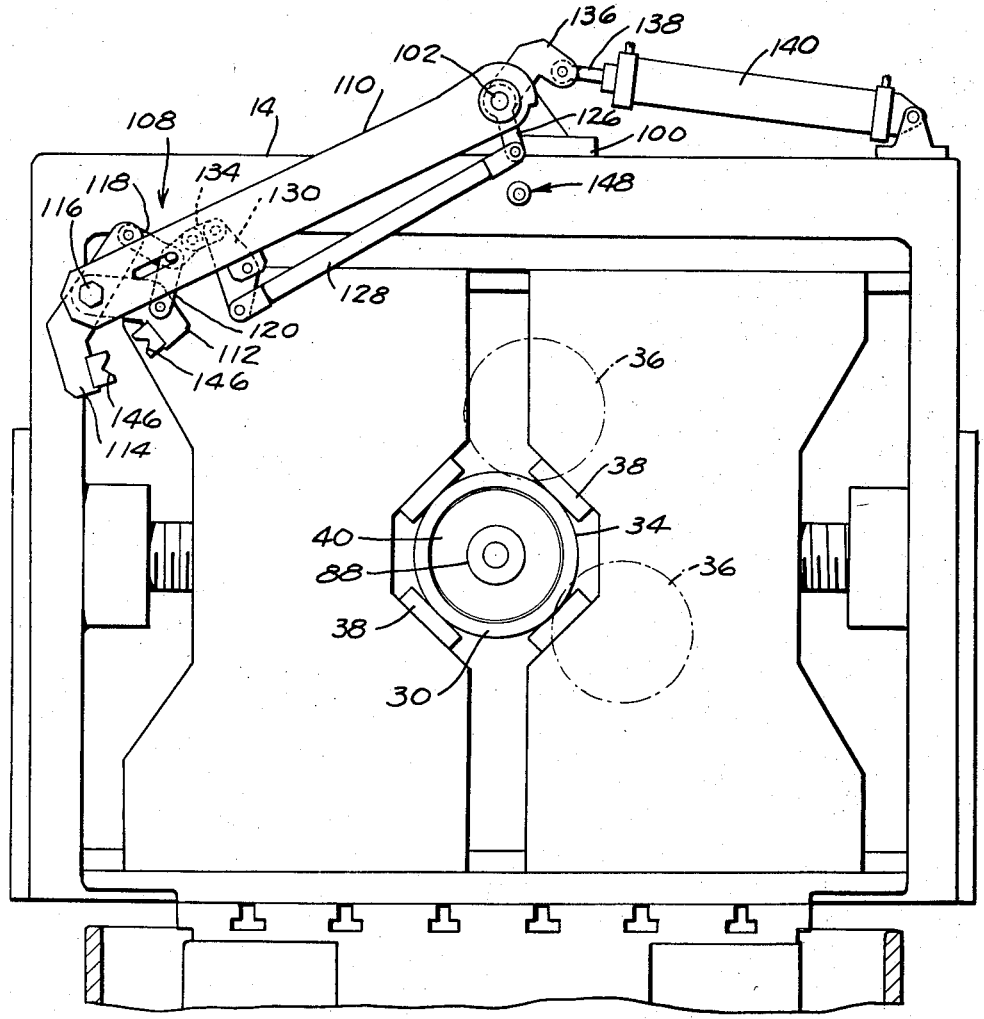
Fig. 3 is a partly diagrammatic elevation taken on line 3—3 of Fig. 1 and showing the device of this invention in an operative position.

Various positions of the cutter 30 relative to the tube 34 during the threading operation are indicated by dotted lines 36 in Fig. 3. The tube is clamped into position during the cutting operation by chuck jaws 38 in the work holders 14 and 16.

An expanding mandrel 40 is inserted within that portion of the tube being machined (Fig. 6) to prevent the walls of the tube from being squashed or deformed by the force exerted thereon by the cutting tool 30. The mandrel has a central supporting shaft 42 with an annular wedging element 44 fixedly secured thereto by such means as a projection 46 on the element engaged in a recess 48 in the shaft. The peripheral surface 50 is conically shaped as shown. Another annular wedging element 52 is axially shiftably mounted on the supporting shaft 42 and the peripheral surface 54 of this element is also conically shaped but is angled to the shaft 42 oppositely to the angle of the surface 50 of the fixed wedge.

Surrounding the shaft and wedges is an expandable band 56 whose outer surface 60 is generally cylindrical and whose inner surface has conically shaped portions 62 and 64 mating with the conical surfaces 50 and 54, respectively, of the wedges. The expandable band 56 is made of a resilient material such as steel and has the form of a circumferentially arranged series of axially extending segments 66 separated by axial slots 68, with alternate slots extending inwardly from opposite edges of the band. The band 56 is secured on the support shaft 42 by such means as a split ring 70 engaged in a notch in the band and supported by plates 72 and 74 fixed by suitable means on the shaft 42.

A ring 76 is slidably mounted on an outwardly projecting portion of the shaft 42 and is fixedly connected to the shiftable wedge 52 by such means as bolts 78 and shouldered bushings 80 which extend through openings provided therefor in the fixed wedge 44 and plates 72 and 74 as shown. A compressed helical spring 82 seats on the shiftable wedge 52 and reacts against a guide cone 84 secured on the inner projecting end portion of the shaft 42 by such means as nuts 86. The spring thus urges the shiftable wedge and the fixed wedge 44 toward each other, thereby tending to expand the band 56. Nuts 86 provide means for adjusting the compression of the spring 82.

The outer end of the shaft 42 is enlarged to form a head 88. The head 88 and the ring 76 have beveled portions 90 and 92, respectively (Figs. 6 and 7), and cooperate to provide means for shifting the wedge 52 in order to control the expansion of the mandrel.

Operating means for the mandrel is illustrated in Figs. 3 through 7. A base 100 is fixed by suitable means on the work holder 14 and an axle 102 is journaled thereon as shown at 104 and 106. A clamp 108 has a body portion or arm 110 secured on the axle in a relatively tight frictional engagement such that the arm rotates with the axle except when secured against rotation by external means. The clamp may include two jaws 112 and 114 mounted on the arm 110 in a pivot 116 and articulated with links 118 and 120 to form a double tong. The links 118 and 120 are connected by a pin 122 shiftable in a slot 124 in the arm 110.

The jaws 112 and 114 are linked to the axle 102 through a bell crank 126 non-rotatably fixed on the axle, a rod 128 pivoted on the crank and on a lever 130, the lever being fulcrumed on the arm 110 as at 132 and connected to the link 118 through a link 134. Means for rotating the axle 102 may include a bell crank 136 thereon actuated by the piston rod 138 of a hydraulic or pneumatic cylinder 140 as shown. The jaws 112 and 114 are provided with teeth 142 beveled as shown at 144

(Fig. 7) to mate cam-wise with the beveled portions 90 and 92 of the head 88 and ring 76. The teeth 142 are also notched as shown at 146 (Figs. 3 and 4) for a purpose to be described.

Figure 4:
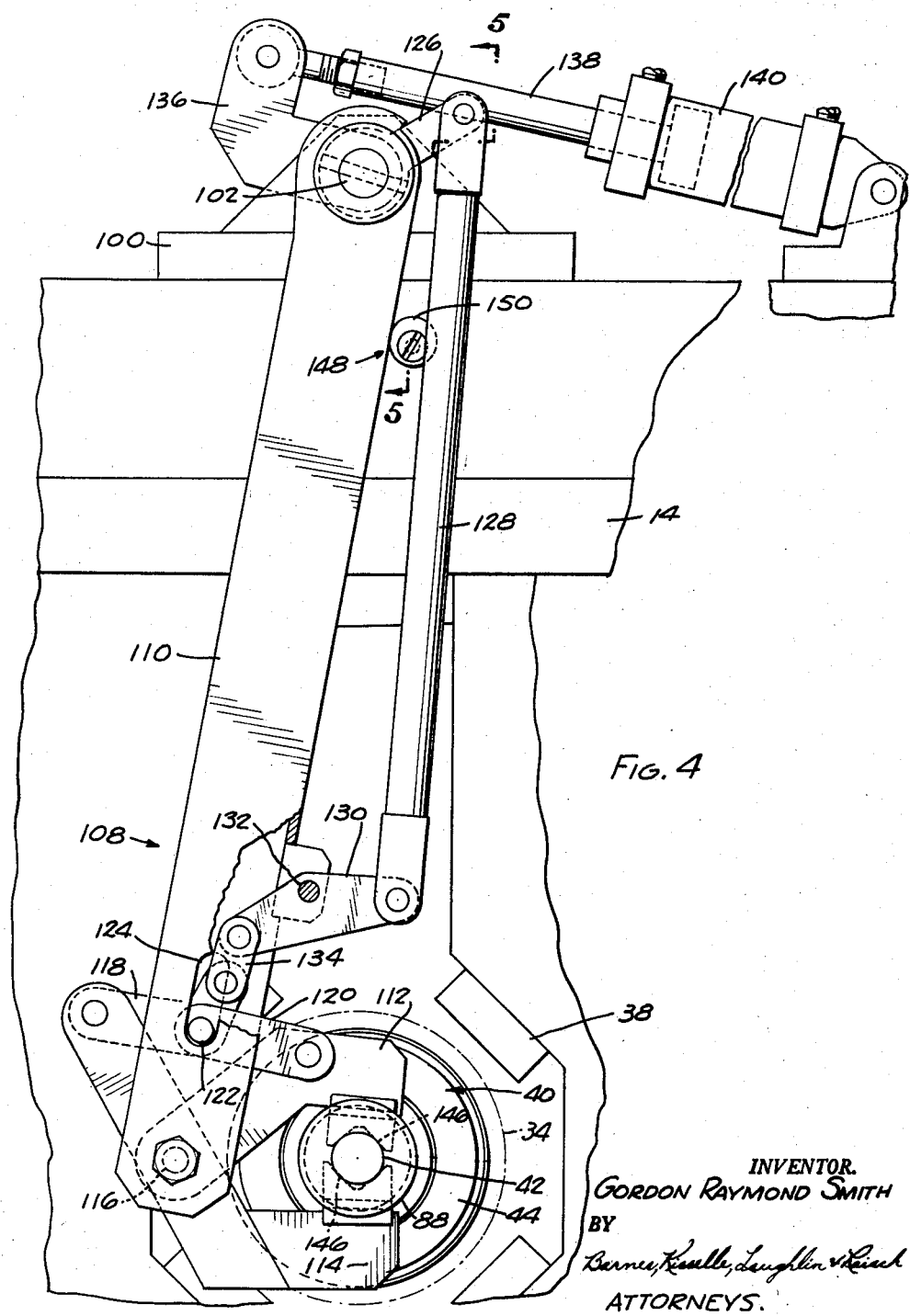
Fig. 4 is an enlarged generally elevational view of the device of this invention with the parts shown in another operative position.
Figure 5:
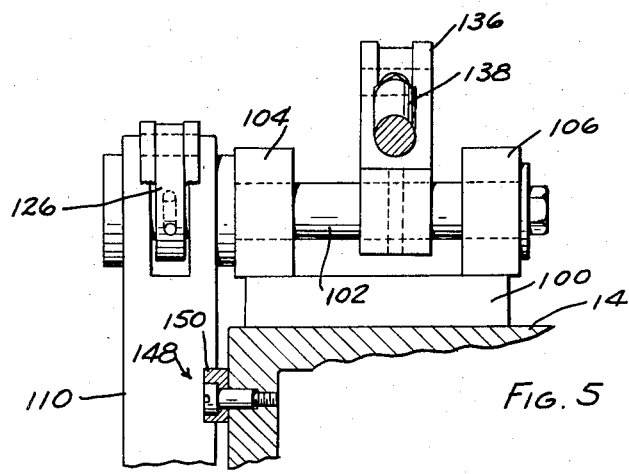
Fig. 5 is a view taken on line 5—5 of Fig. 4.
Figure 6:
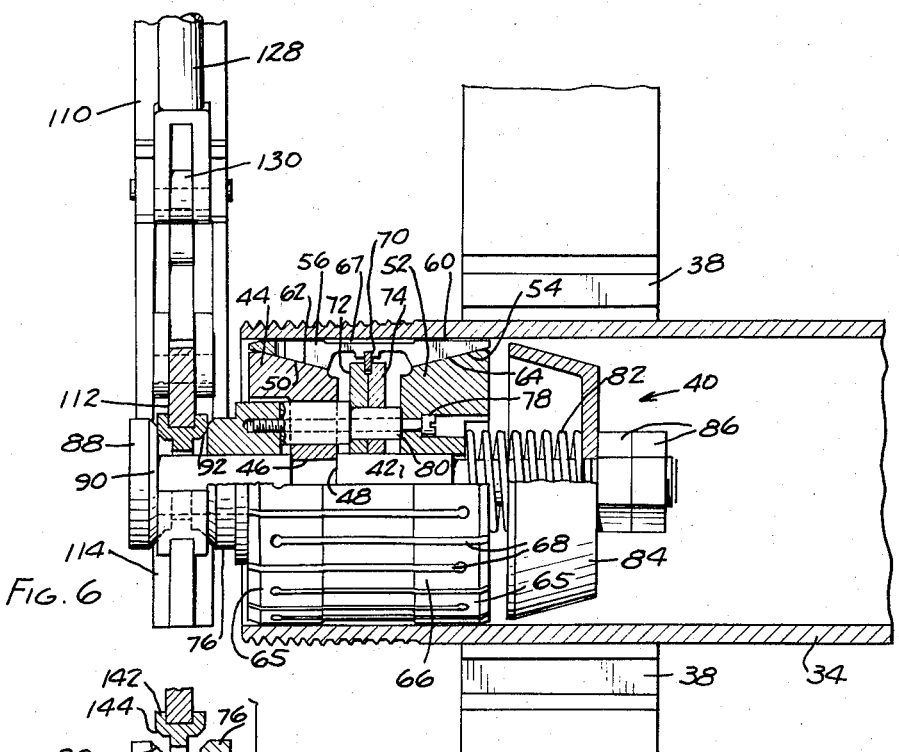
Fig. 6 is partly in section and partly in elevation showing the mandrel inserted in a workpiece and showing the mandrel engaged by the operating means.
Figure 7:
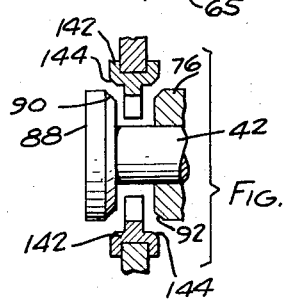
Fig. 7 is a fragmentary view of the operating means disengaged from the mandrel.

In use, the clamp arm is initially in the lowered position of Figs. 4 and 6 with the jaws 112 and 114 closed and engaging the projecting outer end of the mandrel shaft 42. The mandrel is thus supported by the clamp and the expansion control elements 88 and 76 are spread apart by the teeth 142. The wedges 44 and 52 are spread apart and the band 56 is in contracted condition. The cutting tool 30 on the planetary head 12 is in a radially outward position.

A tubular workpiece 34 is inserted into the work holders 14 and 16 and over the mandrel 40, the guide cone 84 guiding the end of the tube to be machined into proper position. The chuck jaws 38 are then advanced to clamp the tube in position. Fluid is then introduced into the cylinder 140 to actuate the crank 136 and rotate the axle 102 in a clockwise direction as Fig. 4 is viewed. The axle 102 turns the crank 126 and depresses the rod 128 which, acting through the lever 130 and link 134, operates the double tong linkage to open the jaws 112 and 114.

The arm 110 is prevented from rotating with the axle by engagement of the notched portions 146 of the teeth 142 with the mandrel shaft 42, the mandrel itself being held stationary by the workpiece 34. When the teeth 142 clear the shaft 42 the arm 110 begins to rotate with the axle 102 because of the relatively tight frictional engagement therebetween. The arm swings aside to the position shown in Fig. 3 to be clear of the planetary head during the machining operation. Motion of the arm is stopped by such means as limiting the stroke of the piston in cylinder 140.

When the teeth 142 withdraw from between the head 88 of the mandrel shaft and the ring 76, the compressed spring 82 shifts the wedge 52 toward the wedge 44 fixed on the shaft, thereby wedging the segments 66 of the band radially outward into tight engagement with the inner wall of the workpiece. The segments may be centrally recessed as shown at 67 to insure secure engagement of the major portions thereof with the workpiece. Since the ring 76 is secured to the wedge 52 it shifts with the wedge toward the head 88 when the teeth 142 are withdrawn.

The planetary head is set into operation carrying the rotating cutting tool 30 into cutting position with relation to the wrokpiece 34 and then carrying the tool in a proper path around the workpiece for cutting the threads thereon. During this machining, considerable force is exerted on the workpiece by the cutting tool. The mandrel 40 within the workpiece provides adequate support for the walls of the workpiece to prevent them from distorting to any substantial extent under the force of the cutting tool. The mating conical surfaces of the wedges 44 and 52 and expandable band 56 lie at an acute angle to the wall of the tube 34 so that it is impossible for the amount of force ordinarily exerted by the cutter 30 to spread wedges against the force of spring 82 and destroy the support offered by the mandrel.

The cutter is returned to a radially outward position when the machining is complete. The cylinder 140 is then actuated to turn the crank 136 and axle 102 in a counterclockwise direction. The arm 110 and rod 128 are swung from the retracted position of Fig. 3 to the Fig. 4 position where the arm 110 contacts a stop 148 on the work holder 14. The arm 110 is held against further movement but rotation of the axle 102 is permitted to continue by slippage in the frictional engagement between the axle and the arm. This continued rotation of the axle raises the crank 126 and rod 128 to clamp the jaws 112 and 114 on the mandrel operating elements 76 and 88 and shaft 42.

The stop 148 preferably includes an eccentric 150 adjustable to stop the motion of the arm 110 when the jaws 112 and 114 are properly positioned with respect to the mandrel.

When the jaws 112 and 114 are closed, the bevels 144 thereon engage the bevels 90 and 92 on the operating elements 76 and 78 of the mandrel and spread them apart in a cam-type action. The wedge 52 is thereby shifted away from the wedge 44 against the action of the spring 82 and the band 56 contracts resiliently and disengages from the workpiece 34. The mandrel is now supported independently of the workpiece by the clamp 108. The chuck jaws 38 are retracted and the tube 34 is removed from the holders 14 and 16. A new workpiece may then be inserted in the work holders and over the mandrel and the process repeated.

In expanding the band 56, the unconnected end portions of adjacent segments 66 spread apart, thus stressing the segments, including interconnected portions 65 thereof. Since alternate slots 68 open on opposite edges of the band, the amount of expansion of all parts of the band will be substantially the same. The band contracts by return of its parts to their unstressed condition.

Thus it is seen that the invention provides a mandrel for hollow workpieces and mandrel operating means facilitating easy engagement and disengagement of the mandrel and such workpieces, the operating means being retractable so that the cutting tool can move toward, around and away from the workpiece in its cutting operation without interference.

I claim:

1. A device for facilitating the machining of hollow workpieces and adapted to be mounted on a milling machine or the like comprising, an expandable mandrel adapted to be received in independent supporting relation by said workpiece, said mandrel including a supporting shaft, a first wedge element fixed on said shaft and a second wedge element shiftable thereon, said wedge elements having oppositely angled conical surfaces, a resiliently expandable element having a workpiece-engaging surface and having an opposite surface with conical portions mating with said conical portions of said wedge elements, spring means on said shaft reacting against said second wedge element to wedge said expandable element against said workpiece, said shaft and second wedge element having outwardly extending portions cooperating to form operating means for controlling the expansion of said mandrel, support means selectively operable and positioned to engage said shaft and support said mandrel independently of said workpiece, and means associated with said support means for shifting said mandrel operating means against the action of said spring means selectively to facilitate removal of said workpiece while said mandrel is being supported independently of the workpiece by said support means.

2. The device substantially as defined in claim 1 wherein a conically shaped guide element is mounted on said shaft for guiding a workpiece to proper position, said guide element forming a seat for said spring means and being axially adjustable, whereby to regulate the stress in said spring means.

3. In a machine for performing a work operation on a hollow work piece of the type having a work holder and a cutting tool adapted to advance to cutting position, move relative to said work piece and return to retracted position, a device for facilitating a machining operation, which comprises an expandable mandrel adapted to be received in independent supporting relation by said such work piece, means on said mandrel operable to control the expansion thereof, a holding and clamping arm mounted on said machine having one end shiftable selectively into and out of the path of said cutting tool, support means on said end of said arm to engage and support said mandrel independently of said work piece, said engaging and supporting means being shiftable when in supporting position to co-operate with said mandrel expansion control means and operable selectively to facilitate removal of said work piece while said mandrel is being independently supported by said support means and said cutting tool is in retracted position and to facilitate removal of said arm from the path of said cutting tool while said mandrel is engaged and supported by said work piece.

4. A device for facilitating the machining of hollow work pieces and adapted to be mounted on a milling machine or the like comprising, an expandable mandrel adapted to engage and to be supported independently by said work piece, said mandrel including a resiliently expandable work piece engaging element, shaft means, expansion control means interconnecting said shaft means and said expandable element, said expansion control means being operable selectively to engage and disengage said element and said work piece, said shaft means and expansion control means having relatively shiftable elements forming operating means for said mandrel, support means selectively operable to engage said shaft means and support said mandrel in a stationary position independently of said work piece, and means associated with said support means for controlling said mandrel operating means selectively to facilitate removal of said work piece while said mandrel is being supported by said support means, said support means being mounted so that it can be retracted away from said mandrel when said support means is disengaged from said shaft means and said mandrel is supported independently by said work piece, whereby to facilitate unobstructed machining of said work piece.

5. A device for facilitating the machining of hollow work pieces and adapted to be mounted on a milling machine or the like comprising, an expandable mandrel adapted to be received in independent supporting relation by said work piece, expansion control means on said mandrel, said means being operable selectively to interengage and disengage said mandrel from said work piece, clamp means adapted to be secured to said machine, said clamp means being shiftable selectively to a mandrel operating and supporting position and to a retracted position remote from said mandrel, said clamp means having relatively movable elements selectively operably engaging said expansion control means when said clamp means is in said mandrel operating and supporting position, said movable elements being arranged to engage and support said mandrel independently of said work piece when said mandrel is disengaged therefrom.

6. A device for facilitating the machining of hollow work pieces and adapted to be mounted on a milling machine or the like comprising, an expandable mandrel adapted to be received in independent supporting relation by said work piece, expansion control means on said mandrel, said means being operable selectively to interengage and disengage said mandrel from said work piece, operating means for said mandrel including an arm adapted to be pivotally secured to said machine so that said arm can be swung selectively to a mandrel operating and supporting position and to a retracted position remote from said mandrel, said arm having relatively movable elements selectively operably engaging said expansion control means when said arm is in said mandrel operating and supporting position, said movable elements being arranged to engage and support said mandrel independently of said work piece when said mandrel is disengaged therefrom.

7. A device for facilitating the machining of hollow work pieces and adapted to be mounted on a milling machine or the like comprising, an expandable mandrel adapted to be received in independent supporting relation by said work piece, expansion control means on said mandrel, said means being operable selectively to interengage and disengage said mandrel from said work piece, operating means for said mandrel including an arm adapted to be pivotally secured to said machine so that said arm can be swung selectively to a mandrel operating and supporting position and to a retracted position remote from said mandrel, said arm having relatively movable elements selectively operably engaging said expansion control means when said arm is in said mandrel operating position, said movable elements being arranged to engage and support said mandrel independently of said work piece when said mandrel is disengaged therefrom, actuating means operable to swing said arm selectively to said positions, linkage operably connecting said actuating means to said movable elements, and means forming a lost motion connection between said arm and said linkage, said lost motion connection being arranged so that said arm remains stationary while said movable elements are being operated.

8. A device for facilitating the machining of hollow work pieces and adapted to be mounted on a milling machine or the like comprising, an expandable mandrel adapted ot be received in independent supporting relation by said work piece, shaft means on said mandrel, said shaft means projecting outwardly thereof to lie in an exposed position relatively to a work piece by which said mandrel is adapted to be supported, a shiftable element cooperating with a portion of said shaft means to form expansion control means on said mandrel, said expansion control means being operable selectively to interengage and disengage said mandrel from said work piece, a support arm, an axle rotatably secured to said arm through a relatively tight frictional joint, said axle being adapted to be rotatably mounted on said machine so that said arm can be swung selectively to a mandrel operating and supporting position and to a retracted position remote from said mandrel, said arm having relatively movable jaws selectively engaging said expansion control means when said arm is in said mandrel operating supporting position, said jaws being arranged to supportingly engage said shaft means when said mandrel is disengaged from said work piece, said jaws being arranged to release said shaft means when said mandrel is engaged with said work piece, actuating means operable to rotate said axle for swinging said arm, fixed means on said axle, linkage operably connecting said fixed means to said jaws, and stop means operative to limit the motion of said arm toward said mandrel operating position to form with said joint a lost motion connection, so that rotation of said axle independently of said arm operates said jaws to disengage said mandrel from said work piece and to support said mandrel independently thereof.

9. A device for facilitating the machining of hollow work piece and adapted to be mounted on a milling machine or the like comprising, an expandable mandrel adapted to be received in independent supporting relation by said work piece, means on said mandrel operable to control the expansion thereof, clamp means having a body portion adapted to be shiftably secured to said machine for movement to one position adjacent said mandrel and to another position remote therefrom, said clamp means having relatively movable elements, said movable elements being operable at said one position to engage and support said mandrel independently of said work piece and to engage said mandrel operating means, actuating means operably connected to said body portion and to said movable elements, and means coordinating said actuating means to shift said body portion and move said elements alternatively, whereby selectively to facilitate removal of said work piece while said mandrel is independently supported by said clamp means and to facilitate shifting of said clamp means independently of said mandrel when said mandrel is supported by said work piece.

10. A device for facilitating the machining of a hollow work piece comprising, a mandrel and support means detachably supporting said mandrel at a predetermined position in space, means operable to hold a portion of said work piece to be machined in proximate relation to said mandrel when said mandrel is supported by said support means, said mandrel being operable upon detachment of said support means therefrom to engage the work piece so that said mandrel and work piece are in mutual support with said mandrel supporting the work piece against force applied thereto during machining and the work piece providing the sole support for said mandrel at substantially said predetermined position in space, said support means being retractable away from said mandrel and the work piece to facilitate unobstructed machining of the work piece and being movable to re-engage and support said mandrel at said position in space, said mandrel being releasable from the work piece upon re-engagement therewith of said support means to facilitate removal of the work piece.

11. The device defined in claim 10 wherein said support means includes means operable to actuate said mandrel for engaging and disengaging a work piece respectively when said support means disengages and engages said mandrel.

12. A device for facilitating the machining of a surface of a hollow work piece comprising, means forming a mandrel which is selectively operable to engage said work piece supportingly against force applied thereto during machining and to disengage said work piece, actuating means supporting said mandrel in a position for receiving said work piece, said actuating means being operable to actuate said mandrel for engaging the work piece and being detachable from said mandrel when the latter is in supporting engagement with the work piece so that the mandrel and work piece are in mutually supporting relation with the mandrel being solely supported by the work piece, said operating means being movable away from the mandrel and work piece upon detachment from said mandrel to facilitate unobstructed machining of the work piece, said operating means being movable for supportingly re-engaging said mandrel and being operative to actuate said mandrel for releasing the work piece upon re-engaging the same.

13. A device for facilitating the machining of a hollow work piece comprising, a mandrel and support means detachably supporting said mandrel at a predetermined position in space, means operable to hold a portion of the work piece to be machined in proximate relation to said mandrel when said mandrel is supported by said support means, said mandrel being operable upon detachment of said support means therefrom to engage the work piece so that said mandrel and work piece are in mutual support with said mandrel supporting the work piece against force applied thereto during machining and the work piece providing the sole support for said mandrel at substantially said predetermined position in space, machine tool means operative to advance toward the work piece, to move in a planetary path relatively to the work piece for machining the same, and to retract from the work piece after the machining, said support means being retractable away from said mandrel upon detachment therefrom to provide a clear path for said machine tool means, said support means being movable to re-engage and support said mandrel at said position in space after the machining, said mandrel being releasable from the work piece upon re-engagement therewith of said support means to facilitate removal of the work piece.

References Cited in the file of this patent

UNITED STATES PATENTS

| | | |
|---|---|---|
| 1,304,906 | Richards | May 27, 1919 |
| 1,548,730 | Mirfield | Aug. 4, 1925 |
| 1,566,370 | Briscoe | Dec. 22, 1925 |
| 1,873,515 | Warren | Aug. 23, 1932 |
| 2,671,371 | Pesqueira | Mar. 9, 1954 |
| 2,692,693 | Newberg | Oct. 26, 1954 |
| 2,734,749 | Benjamin | Feb. 14, 1956 |

FOREIGN PATENTS

| | | |
|---|---|---|
| 469,963 | Germany | Mar. 1, 1929 |
| 503,531 | France | June 12, 1920 |
| 653,837 | Great Britain | May 30, 1951 |